Jan. 19, 1965 M. J. MITCHELL 3,165,875
ROTARY FLAIL-TYPE FORAGE HARVESTER
Filed July 13, 1962 7 Sheets-Sheet 1

INVENTOR.
MELVILLE J. MITCHELL
BY Wolfe, Hubbard,
Voit & Osann
ATTORNEYS.

Jan. 19, 1965  M. J. MITCHELL  3,165,875
ROTARY FLAIL-TYPE FORAGE HARVESTER
Filed July 13, 1962  7 Sheets-Sheet 3

INVENTOR.
MELVILLE J. MITCHELL
BY Wolfe, Hubbard,
Voit & Osann
ATTORNEYS.

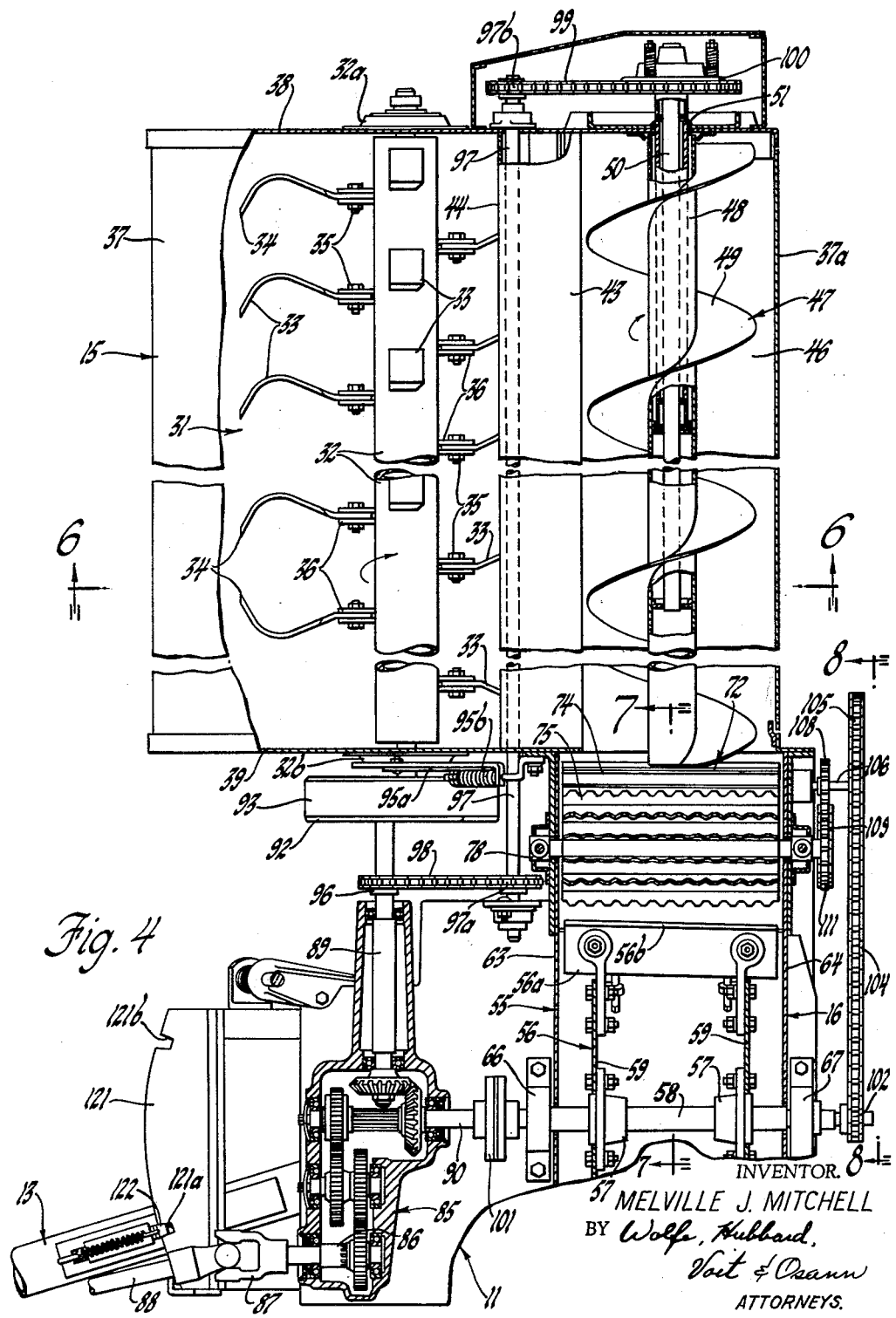

INVENTOR.
MELVILLE J. MITCHELL
BY Wolfe, Hubbard,
Voit & Osann
ATTORNEYS.

Jan. 19, 1965　　　M. J. MITCHELL　　　3,165,875
ROTARY FLAIL-TYPE FORAGE HARVESTER
Filed July 13, 1962　　　　　　　　　　　　7 Sheets-Sheet 6

INVENTOR.
MELVILLE J. MITCHELL
BY Wolfe, Hubbard,
Voit & Osann
ATTORNEYS.

Jan. 19, 1965 M. J. MITCHELL 3,165,875
ROTARY FLAIL-TYPE FORAGE HARVESTER
Filed July 13, 1962 7 Sheets-Sheet 7

INVENTOR.
MELVILLE J. MITCHELL
BY Wolfe, Hubbard,
Voit & Osann
ATTORNEYS.

United States Patent Office 3,165,875
Patented Jan. 19, 1965

3,165,875
ROTARY FLAIL-TYPE FORAGE HARVESTER
Melville J. Mitchell, Birmingham, Mich., assignor to Massey-Ferguson Inc., Detroit, Mich., a corporation of Maryland
Filed July 13, 1962, Ser. No. 209,605
5 Claims. (Cl. 56—24)

This invention relates generally to agricultural harvesters, and more particularly to forage harvesters of the type that are pulled behind a tractor and which employ a rotary flail-type cutter and pickup unit driven by the power take-off shaft of the tractor.

It is the primary object of the present invention to provide a forage harvester which combines an improved flail-type cutter and pickup unit for gathering and initially reducing the crop material with a highly efficient recutting and delivery unit for further processing the crop material and discharging it as desired outside the harvester.

It is a further object to provide in such a forage harvester improved internal conveying and feeding for transferring the crop material directly to the recutting and delivery unit of the harvester. Moreover, a related object lies in the provision of a removable power-driven feeding unit which is self-contained and which may be selectively utilized when controlled and more positive crop-feeding is desired.

Yet another object is to provide such a forage harvester incorporating a recutting device in which the direction of rotation of the recutting and delivery blades is transverse to the line of travel of the harvester, in order to efficiently receive laterally transferred crop material, and yet the crop material is forcibly discharged substantially rearward along the path of travel of the harvester.

It is a further object to provide a harvester of the above type having a rigid integral frame construction which is carried by vertically adjustable transport wheels and which simply, but firmly, supports the operating units of the harvester. A correlated object is to provide a suitable means for adjusting the posture of the pickup unit with respect to the frame so as to vary the height at which the crop is cut.

Another object is to provide an improved draft means for the implement which is selectively positionable so that the implement trails substantially centered behind the tractor for transport or alternatively, with the pickup unit of the implement located outwardly and at one side of a pulling tractor when a crop is being harvested. It is a related object to provide remotely operable hydraulic means for raising and lowering the pickup unit of the implement with respect to the draft tongue between transport and operating positions.

It is also an object to provide a forage harvester of the foregoing type with a self-contained unit for conveniently shapening the recutting blades in place when they become dull or worn.

Other objects and advantages of the invention will become apparent from the following detailed description of a preferred embodiment as illustrated in the accompanying drawings, in which:

FIG. 4 is a horizontal sectional view with portions broken away showing the operating components and driving mechanism;

FIG. 5 is an enlarged partial section with portions broken away, and taken substantially along the line 5—5 in FIG. 2;

Figure 1:
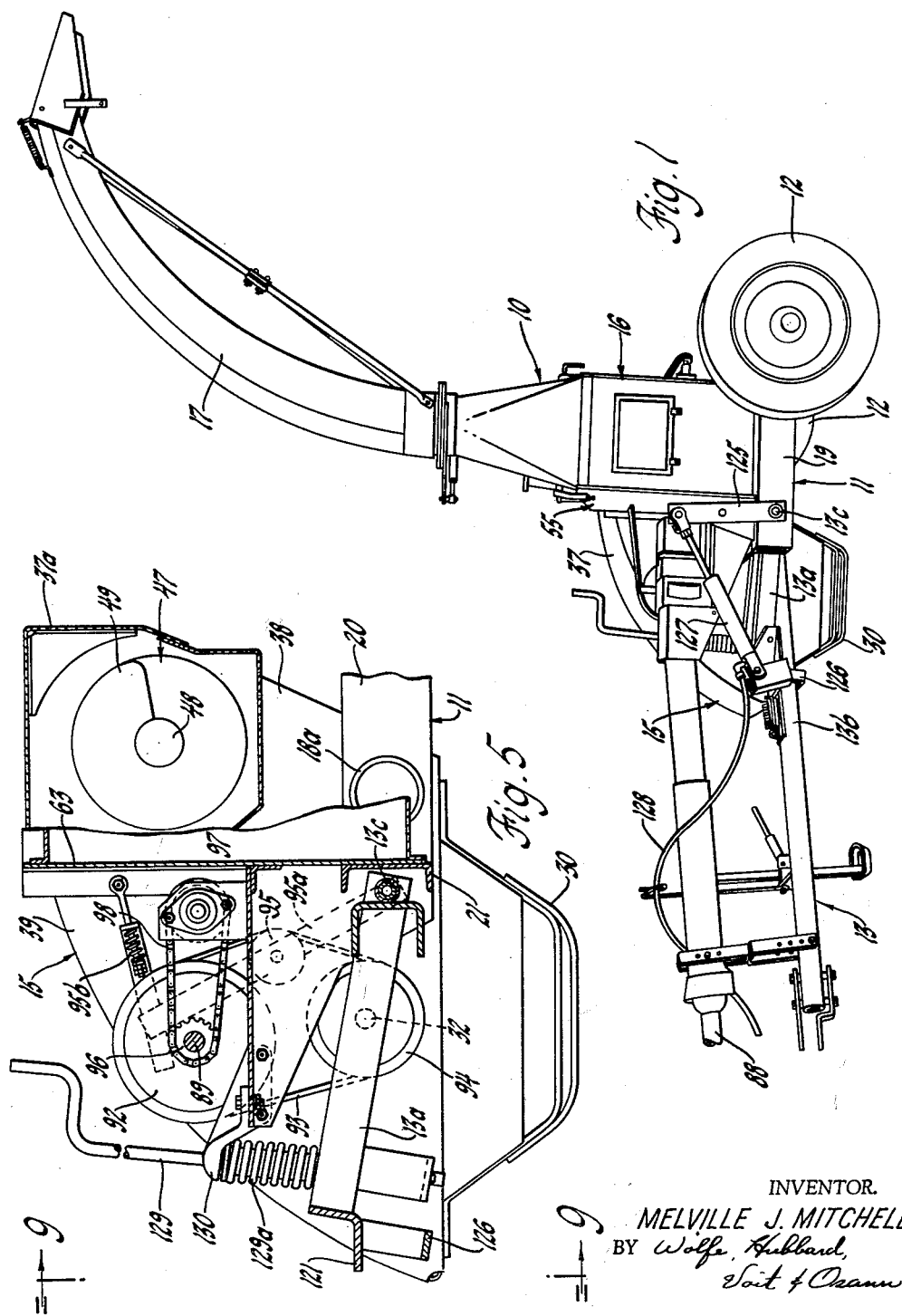
FIGURE 1 is a perspective view of a forage harvester embodying the features of the present invention.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention as defined by the appended claims.

Turning more particularly to the drawings, there is shown a forage harvester 10 having a frame 11 supported upon ground wheels 12 and adapted to be drawn through a field by a tractor (not shown) through a draft tongue 13. The forage harvester 10 includes a cutting and gathering unit 15 for initially collecting the crop material and a recutting or chopping unit 16 for further processing the crop material. An upwardly extending arcuate spout 17 is mounted adjacent the chopping unit 16 for directing processed crop material generally rearward from the harvester, as for example, into a suitable trailing wagon (not shown).

Figure 3:
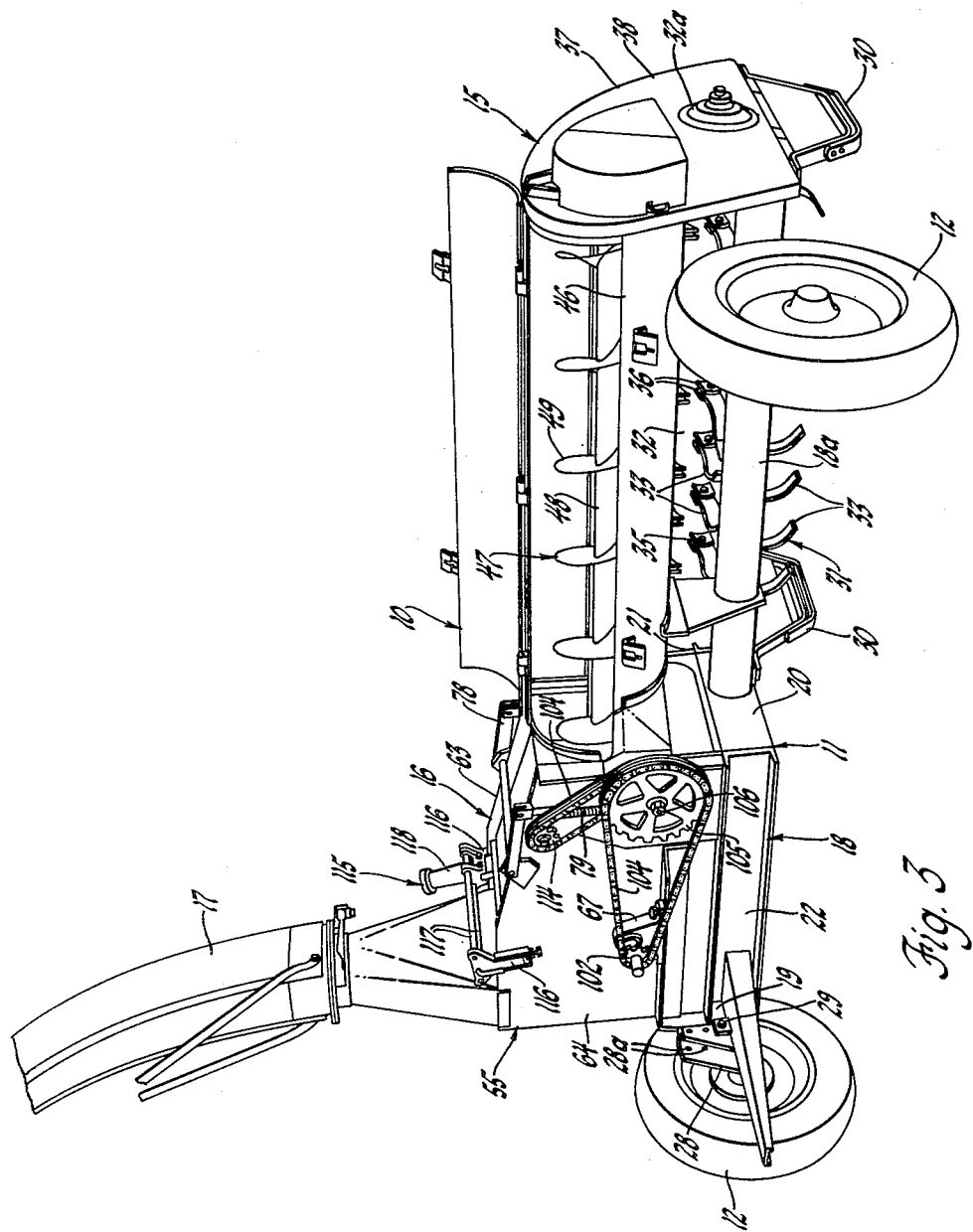
FIG. 3 is a rear perspective view with a portion of the delivery spout broken away.

As can best be seen in FIG. 3, the frame 11 is of rigid integral construction, fashioned in an open skillet-like configuration providing a pan or body portion 18 having an elongated handle portion 18a extending laterally from the body portion. The body portion of the frame consists of two transverse side members 19 and 20 horizontally disposed and generally parallel to one another. The side members 19, 20 are spaced apart and interconnected at their respective ends by a pair of parallel cross members 21 and 22. A cantilevered arm 23 extends rearwardly from the outer end of the frame handle portion 18a and adjacent the rear end thereof is supported one of the ground engaging wheels 12. For this purpose, a leg 24 is provided which is secured to the trailing end of the arm 23 and has a plurality of vertically spaced holes 25 therein for alternative reception of bolts 26 whereby vertically selectable position of the wheel 12 obtains. As shown, the leg 24 is generally channel-shaped and carries an axle 27 upon which the wheel 12 is freely rotatable. Similarly another leg 28 having vertically spaced holes 28a is attached by means of alternatively positionable bolts 29 to the rear cross member 22 of the pan or body portion of the frame 11 for mounting the other ground engaging wheel 12. Auxiliary support for the ends of the pickup unit 15 is provided by suitable skids 30.

The cutting and gathering unit 15 of the forage harvester 10 includes a rotary flail-type cutting reel 31. The rotary flail 31 includes a transversely extending shaft 32 which carries a plurality of swinging knives 33. The shaft 32 is journaled at its outer ends in bearings 32a and 32b. The knives 33 extend radially outwardly from the shaft 32 and are curved at their tip portions so as to form cutting blades. The knives 33 are mounted on the shaft 32 by means of bolts 35 and clevises 36. The clevises 36 are spaced longitudinally and circumferentially of the shaft 32 in such a way that as the shaft rotates the tip portions 34 of the knives 33 traverse successively overlapping paths along the length of the shaft.

The cutting reel 31 is disposed horizontally above the ground within an arcuate housing 37 mounted on the frame portion 18a. The housing 37 includes parallel side walls 38 and 39 which close the ends of the housing and carry the bearings 32a and 32b in which the shaft 32 is journaled. The lower portion of the housing 37 is open and as the forage harvester 10 progresses across a hayfield the rotary flail 31 engages the crop material and lifts it through the open lower portion of the housing 37.

To intercept the crop material which is lifted and cut by the knives 33 a receiving apron 43 is provided within the housing 37. The receiving apron 43 extends between the side walls 38, 39 of the housing 37 and is co-extensive with the shaft 32. The leading edge 44 of the apron 43 is disposed upwardly and rearwardly with respect to the shaft 32 and parallel thereto. It is located adjacent the outer periphery of the paths defined by the knives 33. The leading edge 44 cooperates with the tip portions 34 of the knives 33 to initially cut and sever the collected crop material. Thus, as the forage material which has been cut by the knives 33 is directed upwardly in the housing 37, it passes above and is intercepted by the apron 43 and the upper rear portion 37a of the housing 37.

For collecting the initially cut crop material from the housing 37 a transversely extending trough 46 is located within the rear housing portion 37a and adjacent the rear edge of the apron 43. An auger conveyor 47 is positioned in the trough 46 and rear housing 37a for transferring the crop material from the housing 37. The auger 47 includes a hollow core 48 upon which mounts a helical auger flight 49. The core 48, in turn, is fixed upon an inner shaft 50 which is journaled in a suitable bearing 51 carried by the side wall 38 for rotation in a direction to transport forage received from the flail 31 laterally toward the inner end of the housing portion 37a.

The recutting unit 16 is provided to further condition the chopped forage crop. As shown, the unit 16 is of the reel type and is disposed within a housing 55 carried by and adjacent to the main or pan portion of the frame 11. In the preferred embodiment, the recutting mechanism includes a plurality of cutters 56, including cutting blades 56a, mounted between hubs 57 which, in turn, are carried by a shaft 58. The blades 56a are sharpened to provide forwardly directed knife edges 56b and are of arcuate profile. The blades 56 are carried by radially projecting arms 59 which are detachably secured to the shaft 58 by means of the hubs 57.

To assist the cutting action of the blades 56 a cooperating shear blade 71 is provided. The blade 71 is disposed transversely across the lower margin of entrance into the recutter housing 55.

The recutter housing 55 includes transversely extending parallel side walls 63 and 64 which serve to enclose the cutter reel 56 and also to support bearings 66 and 67 in which the shaft 58 is journaled. It is to be noted that the rotation of the blades 56 is transverse to the direction of travel of the forage harvester 10 and that the blades directly and successively engage chopped crop material laterally transferred by the auger 47 from the pickup unit 15. After having been subjected to the chopping and mixing action of the blades 56 and 71, the further conditioned forage material is delivered from the recutter by the blades 56 directly into the chute 17.

To properly present crop material received from the cross feed auguer 48, 49 to the recutter 16 a feed unit 72 is interposed therebetween. Utilization of this unit is desirable when the crop material is of a fluffy, low density character. Thus the feeder serves to form the crop material into a relatively thin ribbon and to direct it into the entrance throat of the recutter housing 55, across the shear blade 71 for engagement by the recutter blades 56. As shown the feed unit 72 includes a housing 73 comprising that portion of the housing 55 which is interposed between the pickup unit's end plate 39 and the open entrance throat of the recutter housing 55. Disposed within the housing 73 are a pair of positively driven feed rolls 74 and 75 which are arranged for cooperation with an auxiliary roll 76 to engage and press the crop material. Thus the roll 74 is disposed adjacent to and transversely of the lower inner end of the auger 48, 49, and the roll 75 is located parallel to it and inwardly of the roll 74 above it and the auxiliary roll 76. Both rolls 74 and 75 are preferably equipped with radially extending spur blades 74a and 75a, respectively, spaced about their peripheries.

Figure 9:
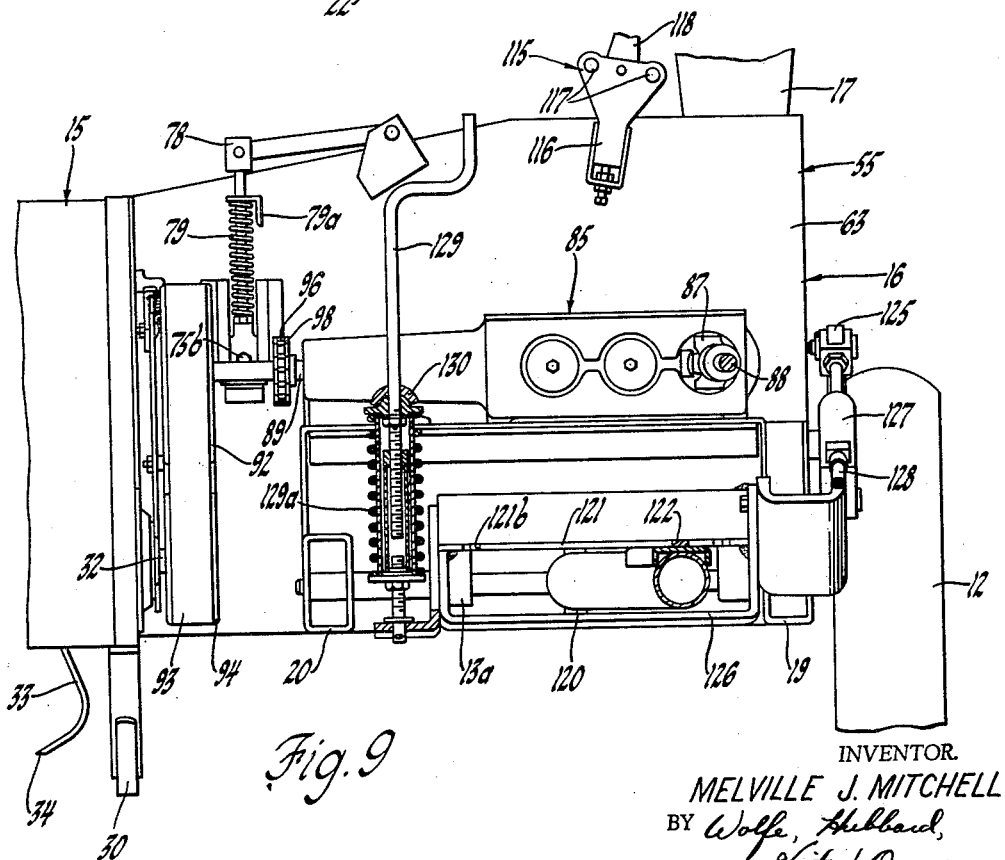
FIG. 9 is a partial section taken along the line 9—9 in FIG. 5.

To assist in accommodating the crop material received in the feeder unit 72 and in pressing it into suitable ribbon form, the upper feed roll 75 is of considerable mass and is mounted for limited vertical movement. To this end the roll 75 is mounted upon a shaft 75b which extends through vertically elongated slots 77 formed in the front and back walls of the housing 73. At its ends the shaft 75b is journaled upon the lower ends of a pair of spaced, articulated carriers 78. The carriers 78 are pivoted at their opposite ends upon the housing 55. Additional downward force is applied to the feed roll 75 by expansion type springs 79 which are carried by the lower portions of the carriers 78 and abutments 79a FIG. 9) which are fixed to the outsides of the housing 73. Thus, as clumps of forage material are passed from the cross feed conveyor 47, the feed roll 75 can rise and fall to pass and partially compact the same so as to present the material to the recutting action of the blades 56 and 71.

Figure 10:
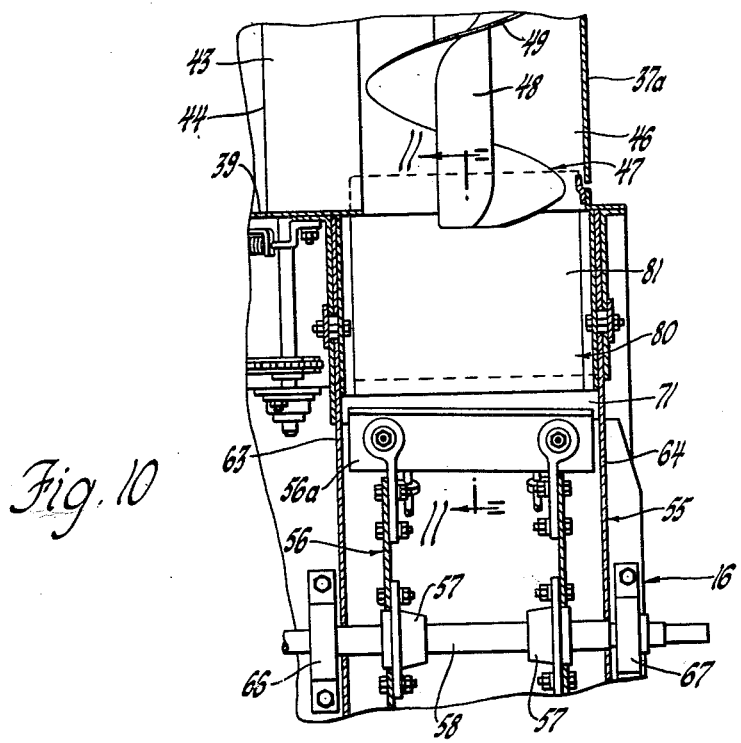
FIG. 10 and 11 are fragmentary views similar to FIGS. 4 and 7, respectively, but illustrating alternative component relationship for operation without the feed roll unit.
Figure 11:
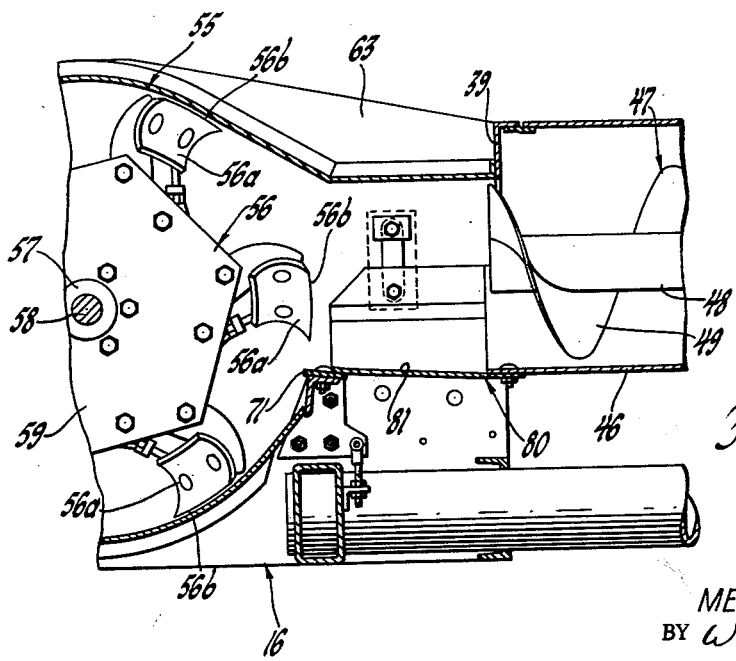

With heavier or more moist forage material utilization of the feeder unit 16 may not be desired for such material will be more compact and will normally tend to lay in ribbon form after it has been initially cut. Thus the present invention contemplates modification by omitting the feeder unit 72. This embodiment is illustrated in FIGS. 10 and 11 wherein the operative portions of the feeder unit 16 as above described have been removed and replaced by a simple transfer housing 80. The feed rolls 74, 75 and 76 and their drive means (hereinafter to be detailed), are removed and the housing 80 is simply inserted in the stead of the feed rolls. It will be noted that the housing 80 is provided with a bottom or horizontal platform which extends from the side plate 39 to the outer edge of the shear blade 71 thereby defining a continuous transfer surface 81 for the traversal thereover of the forage material and its delivery into the recutter 16 for further conditioning.

It is contemplated that implements embodying the present invention derive operating power from the power take-off of the tractor that is utilized to draw them along the field. To this end the illustrative implement incorporates a transfer gear case 85. As shown, the gear case 85 includes an input shaft 86 which is equipped at its forward end with a universal joint 87 by means of which connection is effected with the tractor's power take-off shaft 88. The transfer gear case 85 is provided with two output shafts 89 and 90 which are disposed at right angles to each other and with suitable intermediate spur and bevel gearing to effect a driving connection between the input and output shafts.

The transverse output shaft 89 is used to drive both the flail-type pickup unit 15 and the cross feed conveyor 47. For the former purpose the shaft 89 has a multiple drive sheave 92 fixed to its outer end about which is trained a drive belt 93. The latter also passes about a similar driven sheave 94, of somewhat smaller diameter, which is fixed to the inner end of the flail shaft 32. Belt tension is maintained by an idler 95 (FIG. 5). The idler is journaled upon a support arm 95a which is pivoted at its lower end to the frame 11. At its upper end, upwardly of the roller 95, the arm 95a is pivoted to a tension link 95b which is so spring biased as to urge the idler into engagement with the drive belt 93.

Figure 6:
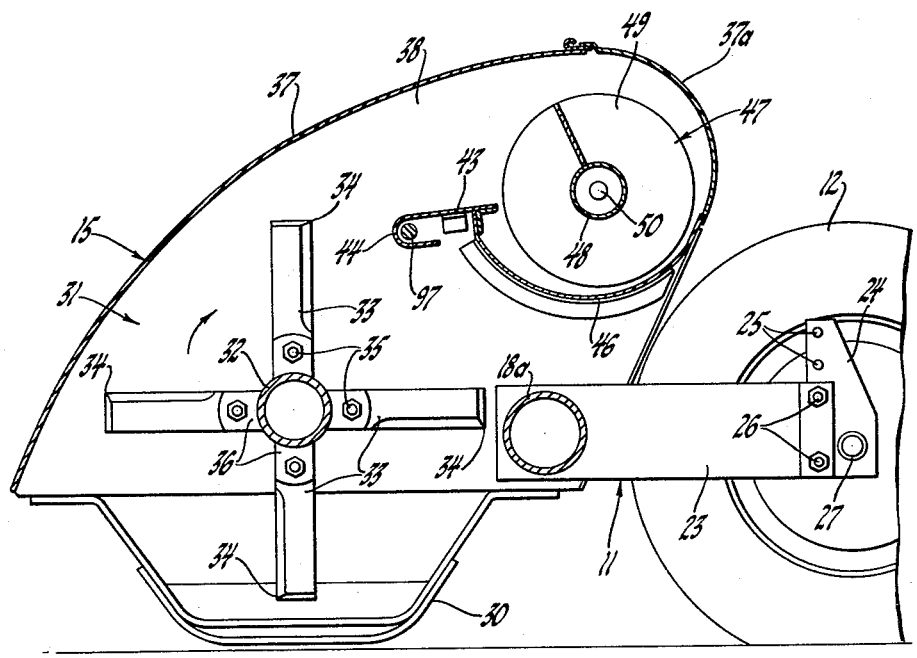
FIG. 6 is a section taken substantially along the line 6—6 in FIG. 4.

The shaft 89, inwardly of the sheave 92, also mounts a drive sprocket 96 from which power is taken to drive the cross feed conveyor 47. For this purpose, the illustrative device utilizes an intermediate shaft 97 as a part of the driving connection. The shaft 97 extends entirely across the housing 37 and is enclosed within the interceptor shelf 43 therein (FIGS. 4 and 6). As best seen in FIGS. 4 and 6, the leading edge 44 of the interceptor shelf or apron 43 is preferably formed with a generally U-shaped cross section so as to enclose the shaft 97 and thereby protect the shaft from the accumulation of crop material. Adjacent its ends the shaft 97 mounts sprockets 97a and 97b. A drive chain 98 connects the sprockets 96 and 97a. Similarly a drive chain 99 is interposed between the sprocket 97b and a sprocket 100 which is fixed upon the outer end of the auger conveyor shaft 50 so as to complete the driving connection thereto.

Figure 7:
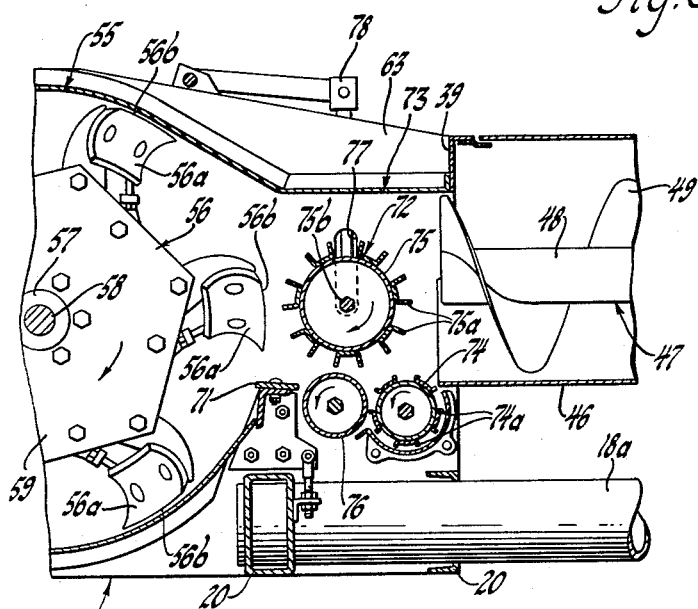
FIG. 7 is a fragmentary section taken substantially along the line 7—7 in FIG. 4.
Figure 8:
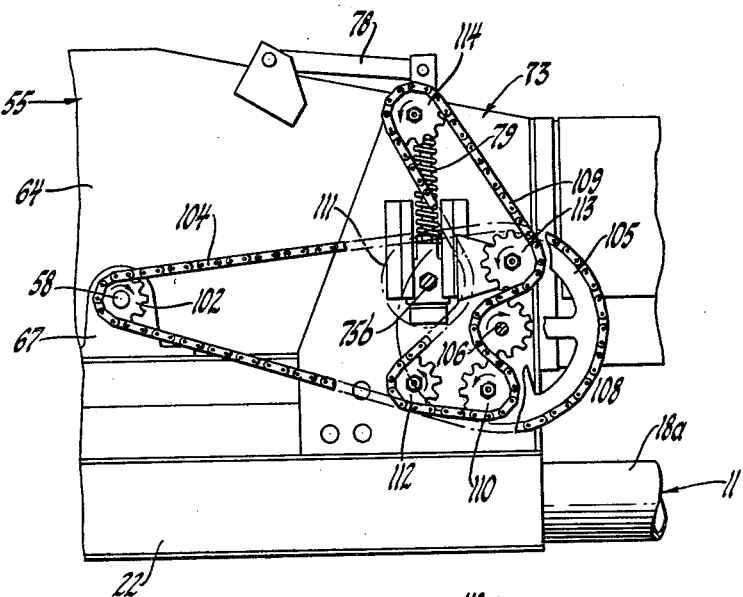
FIG. 8 is a fragmentary elevation taken as indicated by the line 8—8 in FIG. 4, with portions of the large gear broken away to better disclose the parts.

The longitudinally disposed output shaft 90 is used to effect operation of both the recutter unit 16 and the feeder unit 72. Thus it is joined by a coupling 101 directly to the shaft 53 of the recutter 16. A multiple chain and sprocket mechanism is employed in the present instance to drive the rolls 74, 75 and 76 of the unit 72. As can best be seen in FIGS. 4 and 8, the shaft 53 mounts a sprocket 102 on its rear end which engages an intermediate drive chain 104. The chain 104 operates about a large diameter sprocket 105 which is rigid with a stub shaft 106. Also fixed to the shaft 106 is a driving sprocket 108 for drive chain 109. The shafts for the feed rolls 74, 75 and 76 have affixed to their rear ends respectively driven sprockets 110, 111 and 112. The drive sub-assembly which includes the driving sprocket 108, the chain 109, and feed roll sprocket 110, 111 and 112, also includes idler sprockets 113 and 114, which are fixed in position and serve to direct engagement of the chain with the sprockets 110, 111 and 112 so as to effect rotation thereof and consequently of the feed rolls 74, 75 and 76 in the proper directions as indicated by the arrows in FIGS. 7 and 8.

It will be apparent that when operation is desired without the feeder unit 72, as hereinbefore described and as is indicated in FIGS. 10 and 11, the feeder unit drive, too is removed including the drive chains 104 and 109 along with the sprockets 108, 110, 111, 112, 113 and 114 and the shafts to which they are fastened. When removal of the feeder unit 72 and its drive means has been accomplished, it can be replaced simply by the transfer housing 80 as shown.

It will be apparent to one skilled in the art that as a result of continued use of the illustrative forage harvester the recutter blades 56a will become dulled. To rectify this condition the recutter unit 16 is equipped with a resharpener generally indicated at 115 in FIG. 3. As shown the resharpener 115 includes a pair of upstanding brackets 116 which are fixed to the forward and rear walls of the housing 55 of the recutter unit 16 and which support a pair of guide rods 117. Mounted upon the rods 117 is a carrier 118 for movement therealong.

Figure 2:
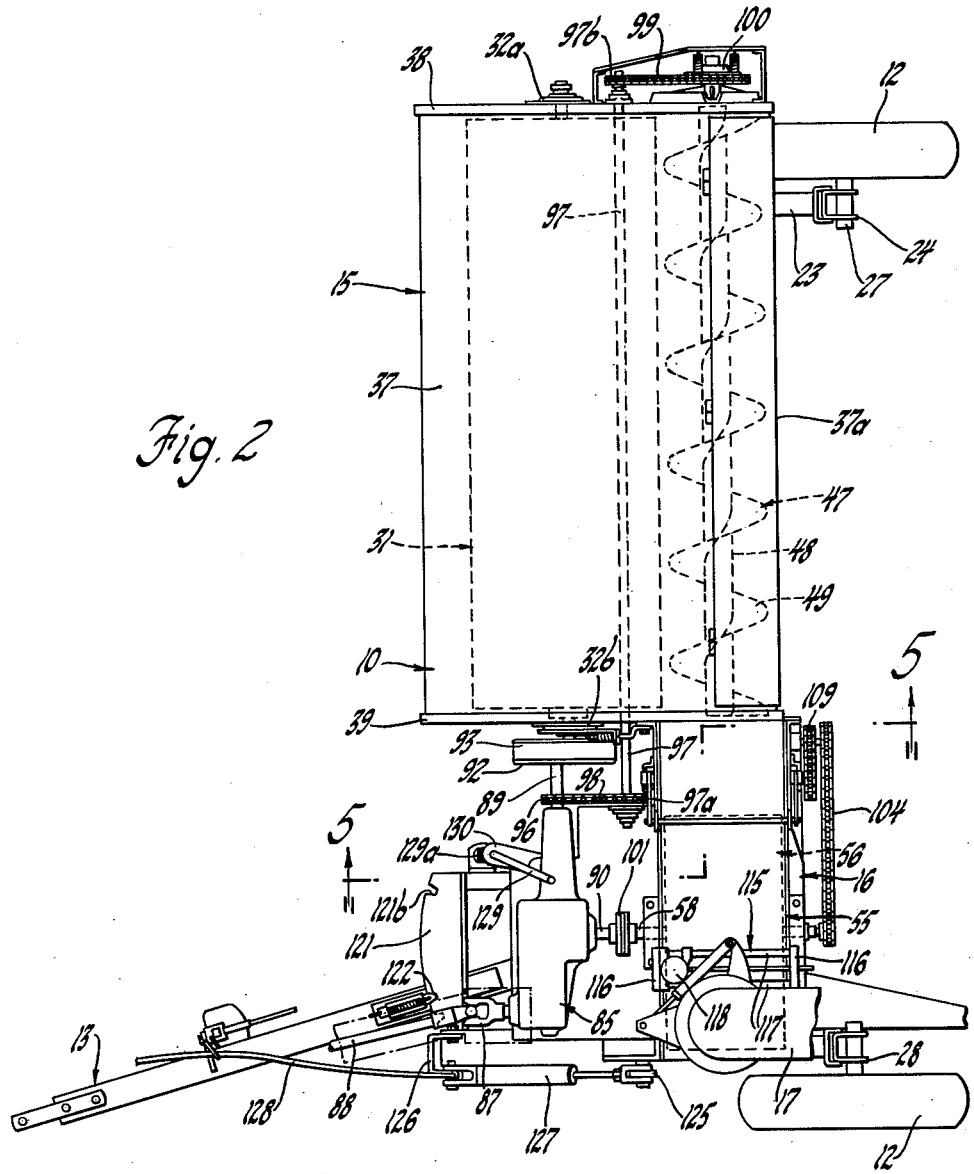
FIG. 2 is a plan view of the forage harvester shown in FIG. 1 with portions of the delivery spout and trailing hitch broken away.

As noted earlier herein a draft connection for the instant forage harvester with a tractor is effected by means of the tongue 13. It is desirable when the harvester is to be transported from place to place to have it generally centered behind the tractor. Yet when the harvester is to be used for its intended purpose it should be so positioned as to extend out to one side of the tractor so that the tractor wheel does not traverse a path ahead and in line with the pickup unit 15. To provide for such relative positioning the draft tongue is connected to the implement frame 11 by means of a kingpin 120. The kingpin is vertically disposed to define a pivot axis at the rear end of the tongue. Projecting forwardly from the frame 11 is a latch bar 121 for cooperation with a spring-biased pawl 122. To this end, the bar 121 is of arcuate form and has a pair of positioning notches 121a and 121b formed therein for alternative reception of the pawl 122. It is apparent from either FIG. 2 or FIG. 4 that the engagement of the powl in notch 121a defines the operating position of the harvester. Similarly, engagement of the pawl 122 in notch 121b defines the transport position of the implement with respect to a pulling tractor.

Additionally, provision is made for altering the attitude of the implement between operating and transport conditions. More particularly when it is desired to move from place to place the harvester is desirably postured so that the flail pickup unit is elevated. But when it is placed for crop harvesting it must be disposed in a manner wherein the desired height of crop engagement obtains. To this end means is provided for altering the attitude of the harvester by effecting limited swinging movement about an axis defined by that of its trailing, ground-engaging wheels 12. Moreover provision is made for effecting such movement remotely as from the draft tractor, and in addition there is incorporated provision for a fine adjustment of the operating posture of the device.

In carrying out this aspect of the novel construction embodied in the illustrative machine it will be noted from FIGS. 1 and 5 that tongue 13 is formed of upper and lower parts 13a and 13b, the latter extending forwardly for attachment at its forward end to the tractor where it is fixed in position. The tongue part 13a is pivoted upon a horizontally disposed axis at 13c upon the implement frame 11. At this same point on the frame there is fixed an upright 125. To the forward end of the tongue part 13a is fixed a lift strap 126 which is of stirrup form and which slidably engages the lower tongue part 13b well forwardly of the pivot axis 13c. Interposed between the lift strap 126 and the upright 125 is an hydraulic actuator 127 to which pressure fluid is supplied by way of a hose 128 from the tractor. Operation of the tractor's pressure fluid control so as to extend the actuator 127 causes a rearward rocking movement of the implement about the axis of its ground-engaging wheels and a consequent elevation of the leading or front end of the pickup unit into transport position. Alternatively, operation to contract the actuator 127 effects a forward rocking movement of the imprement about the wheel axis and of the leading end of the pickup unit toward a lowered or operative position. By means of a manually adjustable screw 129 and biasing spring 129a interposed between a bracket 130, which is rigid with the implement frame 11, and the latch bar 121, which is rigid with the tongue part 13a, appropriate fine adjustment of the operative position of the harvester can be effected.

From the foregoing, it can be seen that a forage harvester incorporating the features of the present invention is capable of effectively gathering the forage crop, initially reducing it, further chopping and homogenizing stems and leaves and delivering it from the machine. At the same time it will be appreciated that the improved harvester is of rugged yet simple construction permitting not only of economical fabrication but also of economical utilization and including facile adjustment to varying field and crop harvesting conditions.

I claim as my invention:

1. For use with a tractor having an auxiliary power take-off shaft, a forage harvester having a wheel-supported frame comprising, in combination, a gear train enclosed in a housing mounted upon said frame, said gear train having an input shaft adapted to be coupled to the power take-off shaft of the tractor, crop gathering means carried on and adjacent to one side of said supporting frame and enclosed in an arcuate housing, said gathering means including a transversely extending rotatable shaft having a plurality of radially extending crop cutting knives pivoted thereon, a transversely extending conveyor also located in said arcuate housing parallel to said shaft and disposed upwardly and rearwardly therefrom so as to receive the crop material from said gathering means and to transfer it toward the other side of said frame, a housing carried on and adjacent to said other side of said supporting frame for receiving the crop material from said conveyor, a recutter including a plurality of transversely rotatable blades affixed to a shaft journaled in said housing, a feeding unit interposed between said conveyor and said recutter including at least two feed rolls disposed at right angles to the end of said conveyor and adjacent said recutter, one of said feed rolls being normally biased toward the other feed roll for compacting the material into ribbon-like form while permitting limited movement away from the other feed roll to provide a variable opening therebetween for accommodating clumps of material received from the conveyor, said gear train having a first output shaft having a driving connection with said gathering means and said conveyor means and having a second output shaft with a driving connection with said recutter shaft so as to rotate the transferred crop material and expel it from said cylindrical housing and means interconnecting said recutter shaft and said feed rolls for rotating said recutter and said rolls in timed relation to each other.

2. In a forage harvesting machine adapted to be trailingly pivoted on the rear end portion of a tractor having an auxiliary power take-off, the combination comprising a generally transverse supporting frame, a flail-type crop cutting and gathering unit carried on and adjacent to one end of said supporting frame and enclosed in an arcuate housing, a conveyor also enclosed in said arcuate housing for receiving the crop material from said cutting and gathering unit and for transferring the crop material toward the other end of said frame, a recutter for further reducing the crop material including a reel-type cutter enclosed in a substantially cylindrical housing carried on and adjacent to said other end of said supporting frame, a feeding unit interposed between said conveyor and said recutter including spaced parallel feed rolls for receiving and compressing the crop material from said conveyor and dispatching it into said recutter, and a transfer gear case mounted on said frame having an input shaft adapted for coupling to the power take-off of the tractor and having two output shafts, means affording a driving connection between one of said output shafts and said cutting and gathering unit and said conveyor, means providing a driving connection between the other one of said output shafts and said recutter reel, and means interconnecting said recutter reel and said feed rolls for rotating said reel and rolls in timed relation to each other.

3. In a forage harvester having a frame supported by a pair of laterally spaced ground engaging wheels with a crop cutting and gathering unit mounted on said frame in advance of said wheels, the combination comprising, a draft tongue having a lower part adapted to be connected at its forward end to a tractor and pivotally connected at its rear end to said frame for swinging movement about a vertical axis, said tongue also having an upper part slidably interconnected at its forward end with said lower part and pivotally connected at its rear end to said frame for swinging movement about a horizontal axis, an upright secured to said frame adjacent said horizontal axis, a hydraulic actuator interposed between said forward end of said upper tongue part and said upright for altering the posture of said frame about the axis of rotation of said wheels between a transport position in which said crop cutting and gathering unit is raised and an operating position in which said crop cutting and gathering unit is lowered, and adjusting means for selectively defining the lower limit of said crop cutting and gathering unit in said operating position.

4. In a forage harvester having a frame supported by a pair of laterally spaced ground engaging wheels with a crop cutting and gathering unit mounted on said frame in advance of said wheels, the combination comprising, a draft tongue having a lower part adapted to be connected at its forward end to a tractor and pivotally connected at its rear end to said frame for swinging movement about a vertical axis, said tongue also having an upper part pivotally connected at its rear end to said frame for swinging movement about a horizontal axis, a lift strap secured to the forward end of said upper tongue part for slidably engaging said lower tongue part at a point forward of said horizontal axis, an upright secured to said frame adjacent said horizontal axis, a hydraulic actuator interposed between said lift strap and said upright for altering the posture of said frame about the axis of rotation of said wheels between a transport position in which said crop cutting and gathering unit is raised and an operating position in which said crop cutting and gathering unit is lowered, and means including a manually adjustable screw and a biasing spring interposed between said upper tongue part and said frame for selectively defining the lower limit of said crop cutting and gathering unit in said operating position.

5. For use with a tractor having an auxiliary power take-off shaft, a forage harvester having a supporting frame carried on ground engaging wheels comprising, in combination, crop gathering means carried on and adjacent to one side of said supporting frame and enclosed in an arcuate housing, said gathering means including a transversely extending rotatable shaft having a plurality of radially extending crop cutting knives pivoted thereon, a transversely extending conveyor also located in said arcuate housing parallel to said shaft and disposed upwardly and rearwardly therefrom so as to receive the crop material from said gathering means and to transfer it toward the other side of said frame, said conveyor having a forwardly projecting apron thereon for intercepting crop material from said gathering means, said apron having a leading edge for cooperating with the tip portions of said knives to initially cut and sever the collected crop material, a recutter carried on and adjacent to said other side of said supporting frame for receiving crop material from said conveyor and for further reducing the crop material, means carried by said frame and adapted for connection with said power take-off shaft for driving said gathering means, conveyor and recutter, said driving means for said conveyor including a transverse shaft extending through said arcuate housing, and said leading edge of said apron formed with a substantially U-shaped cross section in which said transversely extending conveyor drive shaft is enclosed.

References Cited in the file of this patent
UNITED STATES PATENTS

| 2,476,177 | Bloom et al. | July 12, 1949 |
| 2,644,284 | Oberholtz et al. | July 7, 1953 |
| 2,704,429 | Scarlett et al. | Mar. 22, 1955 |
| 2,795,912 | Skromme | June 18, 1957 |
| 2,829,481 | Jarvis | Apr. 8, 1958 |
| 2,843,989 | McClellan | July 22, 1958 |
| 2,947,129 | Kowalik | Aug. 2, 1960 |
| 3,046,720 | Fischer | July 31, 1962 |

FOREIGN PATENTS

| 1,208,357 | France | Sept. 14, 1959 |